United States Patent Office 3,488,204
Patented Jan. 6, 1970

3,488,204
NONFLOATING PIGMENTS
Merrill E. Jordan, Walpole, and John F. Hardy, Andover, Mass., assignors to Cabot Corporation, Boston, Mass., a corporation of Delaware
No Drawing. Continuation-in-part of application Ser. No. 405,247, Oct. 20, 1964. This application Aug. 14, 1967, Ser. No. 660,193
Int. Cl. C09c 1/04, 1/36, 1/62
U.S. Cl. 106—308                                   17 Claims

ABSTRACT OF THE DISCLOSURE

The present invention relates to novel grey pigments and a process for producing same. Said grey pigments are characterized by their good opacifying and tinting powers and by their outstanding nonflooding and nonfloating properties. Broadly, said pigment comprises an inorganic, white-opaque pigment substrate having a light-permeable carbon coating on the surface thereof. Such pigments are produced by coating certain white pigments with an organic material and thereafter thermally decomposing the resulting organic coating.

---

This application is a continuation-in-part of our copending application Ser. No. 405,247, filed Oct. 20, 1964 and now abandoned.

One of the basic problems in the production of tinted paint, enamel or lacquer systems in which mixtures of pigments are utilized is the phenomenon known as "floating and flooding" where, during drying, one or more of the pigments separates or floats apart from the others and concentrates in streaks or patches in the surface of the paint film thus producing a variegated effect. In extreme cases, pigment particles float in such a manner as to produce a color which, though uniform over the whole surface, is markedly different from that of the newly applied wet film. This particular phenomenon is frequently referred to as "flooding."

It is well-known to those skilled in the art that the problem of floating or flooding is especially intransigent in the case of grey enamel lacquers or paints wherein the grey tone is effected by the use of pigment mixtures comprising carbon black and a primary white-opaque pigment. Said problem remains even though the amount of carbon black pigment utilized generally represents no more than from about 2 to about 5 parts per hundred parts by weight of the white-opaque pigment. It is generally agreed that the floating and/or flooding problems involved in grey tinted paints are attributable in large measure to the differences in physical properties of the white and black pigments and particularly to the differences in particle diameters and densities thereof. It is generally believed that solvent currents set up during evaporation carry the smaller and less dense pigment to the surface of the film thereby producing the phenomena of flooding and floating. In order to overcome this problem, the selection of a particular carbon black as a tinting pigment in grey pigmented enamels is especially critical. Thus, channel process blacks, despite their generally excellent black tinting properties, are rarely if ever selected for use in the preparation of grey paints or enamels because said blacks tend to flood and float severely. Normally, the furnace backs (which are generally of larger particle diameter than are channel blacks) are often utilized as tinting pigments in order to ameliorate the flooding and floating problem. However, the use of said furnace blacks frequently also leaves much to be desired. In accordance with the present invention, however, grey pigments are provided in which the floating and flooding problem has been substantially completely solved.

A principal object of the present invention is to provide novel nonfloating, nonflooding grey pigments.

Another object of the present invention is to provide a novel process for producing grey pigments.

Still another object of the present invention is to provide novel nonflooding, nonfloating grey tinted paint, enamel and lacquer compositions.

Other objects and advantages of the present invention will in part be obvious and will in part appear hereinafter.

In accordance with our invention novel nonflooding, nonfloating grey pigments characterized as having outstanding opacifying and color imparting powers when employed in conventional paint and lacquer vehicles are produced by coating an inorganic, primary, white-opaque pigment substrate with an organic material and thereafter thermally decomposing said organic material.

White-opaque pigment substrates suitable for the purpose of the present invention are those particulate pigments characterized as (1) having an index of refraction of above about 2.00 and (2) having an ultimate average particle diameter of between about 100 and 400 millimicrons. Preferably, the pigment substrate has an index of refraction of greater than about 2.50. Specific examples of such pigments are titanium dioxide, zirconium dioxide, zinc oxide and mixtures thereof.

White, inorganic pigments are commonly classified in two groups. The first group, "primary pigments" comprises those white-opaque pigments which have refractive indices substantially greater than about 1.60. Such pigments are conventionally employed in paints and lacquers chiefly in order to opacify and impart color. The second group, known variously as "extenders," "inerts," "fillers," "white nonopaque pigments," "reinforcing pigments" or "low refractive index (L.R.I.) pigments" is characterized by refractive indices of substantially below about 1.75. Such pigments, when employed in conventional oil or varnish paints and lacquers exhibit no more than negligible coloring, opacifying or hiding power. However, when employed in vehicles having corespondingly low refractive indices (e.g. about 1.33 for casein paints and other water-based paints) some members of this group may exhibit hiding power. Consequently, with reference to the criterion of hiding power alone, there appears no fixed line of demarcation between members of this second group from the first group. Therefore, the ability of primary pigments to opacify and impart color when employed in conventional paint and lacquer vehicles appears due, at least in part, to their possessing comparatively high refractive indices relative to the refractive index of the vehicle. However, the opacifying power of these pigments is also dependent on particle size. White pigments, including those having comparatively high indices of refraction, will exhibit little or no opacifying power if their average ultimate particle diameter is substantially less than about one-half the 400 to 700 mµ wavelength range of visible light. Thus, the limitation expressed hereinabove relative to the ultimate average particle diameter of our white-opaque pigment substrates is clearly significant.

Of the primary white-opaque, inorganic pigment substrates suitable for the purposes of the present invention, titanium dioxide is greatly preferred. Pigment grade titanium dioxide, for example, is currently generally produced by (a) precipitation thereof from an aqueous media or (b) high temperature hydrolysis and/or oxidation of titanium compounds such as titanium tetrachloride. The particular method by which the primary pigment substrate is produced is generally not critical to our invention provided that the average particle size limitations set forth hereinabove are not exceeded and the refractive index thereof is above about 2.00.

Organic coating materials suitable for coating the primary pigment substrate are subject to considerable variation. Generally speaking, it is important that said materials (1) decompose substantially completely at sufficiently low temperatures and at sufficiently high rates in order that substantial alteration of the primary pigment substrate crystal structure does not occur, and (2) be themselves substantially inert and give rise to decomposition products which are substantially inert with respect to the primary pigment substrate, (3) be in liquid form during the coating step and (4) upon decomposition yield black residues. Normally, organic materials which comprise substantial quantities of sulfur or metallic element are to be avoided.

It is know that the primary pigment substrates mentioned above undergo crystal structure alteration if maintained at elevated temperatures. For instance, if a titanium dioxide pigment is heated to about 1500° F. for a period greater than about one hour the crystal structure thereof is generally irreversibly and substantially altered. Thus, it is important that the coating of organic material decompose substantially completely to yield black residues at temperatures and times which will not substantially affect the crystal structure of the primary pigment substrate.

Many organic materials conform to the above-mentioned criteria and are suitable for use as the organic coating materials of the present invention. Classes of organic materials which are generally suitable include, for example: aromatic amines, aromatic nitrates, liquid and liquifiable aliphatic or aromatic hydrocarbons, mono- and polysaccharides, proteins, lipids, liquid and liquifiable olefinic monomers and polymers and mixture thereof.

Specific examples of organic materials which are suitable are: aniline, ethylaniline, nitrobenzene, toluidine, dinitrobenzene, methyl dinitrobenzene, methylbutylnitrobenzene, decane, duodecane, benzene, toluene, xylenes, mesitylene, kerosenes, naphthas napthalenes, arabinose, sucrose, mannose, fructose, maltose, galactose, dextrose, beet sugars, cane sugars, starches, molasses, honey, blood plasma, agar, gelatin, animal fats, linseed oil, cottonseed oil, mineral oil, mineral jelly, vinyl pyrrolidone, polyvinyl pyrollidone, polyethylene, polypropylene, vinyl acetate, polyvinyl acetate, polybutylene, vinyl chloride, polyvinyl chloride, and the like. Materials belonging to the classes consisting of saccharides, proteins and mixtures thereof are generally much preferred as the organic coating materials of the present invention because said materials (1) are generally readily available in relatively pure form, and (2) tend to remain on the surface of the pigment substrate when heated, for example by caramelizing rather than vaporizing therefrom.

Generally speaking, organic materials which are normally solid at the projected coating conditions can be utilized by being dissolved in a suitable solvent and subsequently being coated upon the primary pigment substrate. Any solvent which does not react deleteriously with the primary pigment substrate can either be substantially removed from the substrate prior to thermal decomposition of the coating material or in the case of an organic solvent also serve as a suitable coating material. Accordingly, water soluble organic coating materials, such as sugars, can be dissolved in water prior to the coating step and the water removed after the coating step in any suitable manner such as by flash vaporization. Similarly, the viscosity of an organic coating material, such as aniline, can be lowered by dissolution thereof in a solvent which also constitutes a suitable organic coating material such as benzene.

The method by which the primary pigment substrate is coated with the organic coating material is generally not critical provided; of course, that a relatively even coating results. The coating procedure required to provide an even coating is largely dependent upon the physical properties of the particular organic material utilized and the amount and form in which said coating material is to be utilized. Generally speaking, the greater the viscosity of the organic coating material the greater will be the effort required to apply the coating. For instance, in order to coat a primary pigment substrate with a 5% aqueous solution of sucrose, which solution has a relatively low viscosity at standard conditions, passive coating methods such as hand mixing of the primary pigment substrate into the solution of organic material are generally satisfactory. However, when a relatively viscouse coating material is to be utilized, such as a 50% gelatin solution, more stringent mixing action such as by ball milling or micropulverizing of the pigment substrate and the organic coating material together is usually preferred.

A coating method we have found to be particularly suitable in the practice of the present invention comprises forming a slurry comprising the primary pigment substrate and the coating material and thereafter spray drying said slurry. By "spray drying" we mean those drying processes wherein a slurry is subdivided into discrete droplets and is conveyed while in said subdivided state into a zone maintained at temperatures sufficient to dry said droplets. A more complete description of spray drying systems and processes can be had when reference is made to "Design and Use of Spray Dryers," pages 83–88 of Chemical Engineering, Sept. 30, 1963. By adjusting the concentration of the coating material solution, the weight ratio of primary pigment substrate to said coating material solution and/or the spray drying process parameters precise control of the coating can generally be readily effected.

The concentration of organic coating material on the surface of the primary pigment substrate after the coating step and prior to the decomposition step is subject to considerable variation and is dependent, to a large extent, upon the ultimate grey tone desired and the particular organic coating material utilized. Normally, the greater the concentration of a particular organic coating material the darker will be the resulting grey tone. Generally speaking, concentrations of between about 2% and about 20% organic coating material based on the weight of primary pigment substrate are found to be satisfactory. Concentrations substantially greater than about 20%, i.e. above about 25%, usually result in inferior primary grey pigments.

After coating the primary pigment substrate with the organic coating material, the organic material is decomposed preferably by heating to above the decomposition temperature of the organic coating material for a period of time sufficient to decompose said material but below the temperature and/or period of time which would appreciably alter the crystal structure of the primary pigment substrate. The heating can be effected in any suitable manner such as by heating the coated substrate in an oven or by passing the coated substrate through calcining apparatus. Said heating is preferably carried out in a reducing or inert atmosphere, although an oxidizing atmosphere can, under carefully controlled conditions, be utilized if desired. When an oxidizing atmosphere is provided, however, heating should normally be accomplished only to the extent to which the desired or maximum grey color is achieved. Generally speaking, the higher the temperature (for a given amount and type of coating) the shorter will be the time required for decomposition of the organic materials.

Grey paint, enamel and lacquer formulations are produced when the primary grey pigments of the present invention are dispersed into suitable liquid vehicles. Liquid vehicles suitable for use in the paint, enamel and lacquer formulations of the present invention generally include any vehicle of the oil base, oleoresinous base, natural or synthetic resin base types. Specific examples of generally suitable vehicles are: linseed oil, cottonseed oil, alkyd resins, latex, oil modified latex, acrylic resins, epoxy resins, polyester resins, polyurethanes, melamine, polyvinyl acetate, nitrocellulose, acetate/butyrate, styrene/butadiene and the like.

Generally, there is no critical limitation either as to the quantity of the primary grey pigment which can be utilized in the paint, enamel or lacquer formulations of the present invention or as to the manner by which said pigment is dispersed into the vehicle. The tinting strengths of the primary grey pigments of the present invention are, to a large extent, dependent upon parameters such as the type of primary pigment substrate utilized, the average particle size of the said pigment substrate, the type and amount of organic coating material utilized, the extent of decomposition of the coating material achieved, the amounts and types of additives, extenders, solvents and the like to be added to the formulation, etc. Thus, determination of the proper amount of primary grey pigment to be dispersed in a particular vehicle in order to provide a given intensity and/or hiding power to the contemplated formulation can be made when the above mentioned parameters are considered. Usually, however, the amount of primary grey pigment utilized will fall within the range of between about 0.5% and about 50% by volume of the liquid vehicle.

There follows a number of non-limiting illustrative examples.

EXAMPLE 1

To an aqueous solution comprising 600 milliliters of distilled water and 10 grams of common granulated sugar there was introduced 200 grams of R–900 titanium dioxide, a pigment grade, pyrogenic titanium dioxide produced by E. I. Du Pont de Nemours, Inc. Said pigment has an index of refraction of about 2.76 and an ultimate average particle diameter of about 250 millimicrons. The resulting mixture was then mixed by high speed laboratory mixer for five minutes. The resulting slurry was then spray dried at an inlet temperature of about 400° F. and an outlet temperature of about 250° F. Next, the sugar coated pigment was placed in a porcelain crucible and heated in air to about 1800° F. for about 7 minutes. The resulting pigment was found to have a grey tone. Next, a mill paste formulation comprising 35 grams of said grey pigment, 64 grams of an alkyd resin having an index of refraction of 1.55 and about 14.2 grams mineral spirits was prepared in a ball mill. An enamel was then produced by ball milling said mill paste formulation with about 56 grams of the same alkyd resin used in the mill paste formulation, 0.7 gram of a cobalt naphthenate drier, 1.8 grams of a lead naphthenate drier, 0.6 gram of a manganese naphthenate drier and about 0.3 gram of an anti-skinning agent. Several drawdowns of the medium grey tinted enamel formulation ranging in wet film thickness from about 0.0005 to about 0.003 inch were made on drawdown charts comprising a glossy, white, double-weight paper, the surface of which is imprinted with one-half inch wide black lines so as to describe a pattern thereon. The dried grey tinted films were subsequently free from flooding and floating. Moreover, the films were found to be fully opaque, said films having completely obscured the printed pattern of the hiding power chart.

About 100 grams of the grey alkyd enamel produced in Example 1, containing about 20 grams of the treated titanium dioxide is mixed with about 100 grams of a white titanium dioxide pigmented alkyd enamel. The resulting grey enamel has a light grey tint and is found to be substantially free from flooding and floating characteristics.

EXAMPLE 2

A grey alkyd enamel having a medium grey tint substantially similar to the tint of the enamel formulation produced in Example 1 is compounded by ball milling about 34 grams of R–900 titanium dioxide, about 1.0 grams of a furnace black, about 64 grams of an alkyd resin and about 14.2 grams of mineral spirits. The resulting mill paste formulation was ball milled with about 56 grams more of said alkyd resin and the same amounts and types of drying and anti-skinning agents as utilized in Example 1. Several 3 mil drawdowns of the resulting enamel formulation exhibited severe flooding and floating.

EXAMPLE 3

To a 1000 milliliter pebble mill there was charged 200 grams of R–510 titanium dioxide having an ultimate average particle diameter of about 250 millimicrons and an index of refraction of about 2.70 produced by E. I. du Pont de Nemours, Inc. and 10 grams of aniline. The pebble mill was then rolled for about 15 hours. Next, the aniline coated titanium dioxide was placed in a porcelain crucible and heated to about 1800° F. for about 10 minutes. The resulting pigment was grey in color and when suitably dispersed in a variety of paint, enamel and lacquer vehicles was found to be substantially free from flooding or floating tendencies. Moreover, the grey tinted films formed by said coating compositions were found to be completely opaque.

EXAMPLE 4

To a solution comprising 35 grams aniline and about 600 milliliters n-hexane there is charged about 200 grams R–510 titanium dioxide pigment. The resulting mixture is then manually stirred for about 10 minutes and the n-hexane is then removed by distillation of the mixture at about 70° C. The aniline coated titanium dioxide is then charged to a heated tube having an inlet at one end and an outlet at the other end and said coated titanium dioxide is heated to and maintained at about 1700° F. for about 15 minutes by continuously flowing through said tube nitrogen gas preheated to about 1800° F. The tube and its contents are then cooled by flushing room temperature nitrogen gas therethrough. It is found that a dark grey pigment has been produced which when dispersed into a nitrocellulose lacquer vehicle provides a grey lacquer composition having good opacifying properties and which does not substantially flood or float.

It should be noted that the production of pigments by coating clays, micas or other white non-opaque pigments or the like with an organic material and thereafter thermally decomposing the organic material coating has been accomplished in the past and is known to the art.

However, it should be further noted that the only pigments having tinting and hiding powers suitable for use in conventional paint, lacquer or enamel vehicle that are producible through the practice of such processes are black in color. Accordingly, a translucent pigment substrate such as mica, having an index of refraction of about 1.57 provided with a translucent carbon coating does not enter into the tinting of opacifying mechanism in paint vehicles.

Although we are unable to fully explain why the pigment products resulting from the practice of our invention are normally grey in color, we believe that the carbon coating formed on the white opaque pigment substrates is such that a quantity of the incident lightwaves contacting said pigments are permitted to penetrate said carbon coating and because of the high index of refraction and suitable ultimate average particle diameter of the underlying pigment substrate are refracted and reflected back through the carbon coating. The net visual effect produced by this simultaneous absorption of light by the carbon coating and scattering and reflectance of light by the substrate is the resulting grey tint possessed by the novel produce of our invention. Examples 5 and 6 are presented in order to provide a basis for comparison between the unique properties of the grey pigments of the present invention and the pigments resulting when clay or mica are utilized as the substrate materials.

EXAMPLE 5

This example is essentially a duplicate of Example 1 with exception that instead of the titanium dioxide utilized in Example 1, there was utilized in this example 200 grams of Ultra White 90, a high quality white kaolin clay having an average particle diameter of less than about 2 microns and an index of refraction of about 1.56, mined and marketed by Minerals and Chemicals Phillip Corporation, N.J. The resulting pigment was found to be black in color. About 35 grams of said pigment were dispersed by ball milling in approximately 130 grams of an alkyd resin. Three mill drawdowns of the black alkyd enamel reveal that the black pigment has a relatively very low tinting strength as compared to the pigment produced in Example 1.

Further, it is important to note that the opacifying power exhibited by the novel grey pigments of our invention when employed in conventional paint and lacquer compositions is due primarily to the nature of the white opaque substrates. Coated pigments produced from substrates whose indices of refraction or particle size ranges fall outside the limits set forth hereinabove, have been found to exhibit little or no opacifying power in conventional paint and lacquer compositions. Example 6 is presented in order to provide a basis for comparison between the opacifying power of the grey pigment of the present invention and a coated pigment produced when a white non-opaque pigment is utilized as a substrate.

EXAMPLE 6

This example is essentially a duplicate of Example 1 with the exception that instead of the titanium dioxide (refractive index 2.72) utilized in Example 1, there was utilized in this example 200 grams of a water ground white mica (Concord Wet Ground Mica No. 200/325), having an average platelet size of about 440 millimicrons and a refractive index of 1.57. The resulting pigment was found to be beige in color. About 35 grams of said pigment was dispersed by ball milling in approximately 130 grams of an alkyd resin having an index of refraction of 1.55. One-half mil drawdowns of the enamel composition were made on a hiding power chart. The dried films were subsequently examined and were found to comprise a beige tinted transparent film having substantially no hiding power.

Obviously, many changes can be made in the above examples and description without departing from the scope of the present invention.

For instance, although in the above examples only alkyd resin and nitrocellulose vehicles were specifically mentioned, obviously other paint, enamel and lacquer vehicles are also suitable. For instance, the nonflooding, nonfloating primary grey pigments of the present invention can also be utilized in linseed oil, styrene/butadiene, and other vehicles.

Obviously, the grey tinted paint, enamel and lacquer formulations of the present invention can also include any other ingredients normally utilized in such formulations, for example, other pigments and extenders such as clay, calcium carbonate, wollastonite, silicas and talc, drying oils such as soy-bean oil, dehydrated castor oil, fish oil, tung oil, and treated drying and semi-drying oils, solvents such as mineral spirits and petroleum solvents in general, thinners such as acetone, fungicides such as phenyl mercury oleate.

Moreover, it should be noted that our pigments can be utilized not only as paint, enamel and lacquer pigments, but also generally in any capacity in which titanium dioxide pigments, either alone or in combination with other pigments are suitable. Thus, the primary grey pigments of the present invention can be utilized, for example, as coloring pigments in inks or as fillers or pigments for polymeric materials such as polyethylene or polypropylene.

Therefore, it is intended that the above disclosure be regarded as illustrative in nature and as not limiting the scope of the present invention.

What is claimed is:

1. A process for producing nonflooding, nonfloating grey pigments which comprises coating an inorganic, white opaque pigment substrate having an ultimate average particle diameter of at least about 100 millimicrons and an index of refraction of at least about 2.00 with between about 2% and about 20% by weight of said substrate of an organic coating material and subsequently heating said coated substrate to decompose said organic material.

2. The process of claim 1 wherein said pigment substrate has a refractive index of at least about 2.50.

3. The process of claim 1 wherein said pigment substrate is chosen from the group consisting of titanium dioxide, zirconium dioxide, zinc oxide and mixtures thereof.

4. The process of claim 3 wherein said pigment substrate is titanium dioxide.

5. The process of claim 1 wherein said organic coating material is chosen from the group consisting of saccharides, proteins and mixtures thereof.

6. The process of claim 5 wherein said organic coating material is a saccharide.

7. The process of claim 1 wherein said organic coating material is a sugar.

8. A process for producing a nonflooding, nonfloating grey pigment which comprises:
  (a) providing a slurry comprising an organic coating material and a particulate white-opaque pigment substrate having an ultimate average particle diameter of at least about 100 millimicrons and an index of refraction of at least about 2.00;
  (b) spray drying said slurry under conditions which provide a coating of said organic material on said substrate of between about 2% and about 20% by weight of said substrate; and
  (c) heating the resulting coating pigment sufficiently to decompose said organic material.

9. The process of claim 8 wherein said pigment substrate has an index of refraction of greater than about 2.50.

10. The process of claim 8 wherein said pigment substrate is chosen from the group consisting of titanium dioxide, zirconium dioxide, zinc oxide and mixtures thereof.

11. The process of claim 8 wherein said pigment substrate is titanium dioxide.

12. A novel coating composition comprising a paint, enamel or lacquer vehicle and a nonflooding, nonfloating grey pigment consisting of an inorganic, white-opaque pigment substrate having an ultimate average particle diameter of at least about 100 millimicrons and an index of refraction of at least about 2.00 which has been coated with between about 2 and about 20% by weight of an organic material which material has been thermally decomposed to carbon to yield said grey pigment.

13. The novel coating composition of claim 12 wherein said pigment substrate is a member chosen from the group consisting of titanium dioxide, zirconium dioxide, zinc oxide and mixtures thereof.

14. The novel coating composition of claim 12 wherein said pigment substrate is titanium dioxide.

15. A novel nonflooding, nonfloating composite grey pigment having high opacifying and tinting powers in paint, enamel or lacquer vehicles which comprises an inorganic white-opaque pigment substrate having an ultimate average particle diameter of at least about 100 millimicrons and an index of refraction of at least about 2.00 bearing on the surface thereof a light-permeable carbon coating.

16. The nonflooding, nonfloating grey pigment of claim 15 wherein said pigment substrate has an index of refraction of at least about 2.50.

17. The nonflooding, nonfloating grey pigment of claim 15 wherein said pigment substrate is titanium dioxide.

References Cited

UNITED STATES PATENTS

| | | | |
|---|---|---|---|
| 3,087,827 | 4/1963 | Klenke et al. | 106—307 |
| 3,107,173 | 10/1963 | Klenke | 106—307 |
| 3,188,225 | 6/1965 | Walker | 106—307 |

JAMES E. POER, Primary Examiner

U.S. Cl. X.R.

106—296, 299, 300, 307, 309

UNITED STATES PATENT OFFICE

CERTIFICATE OF CORRECTION

Patent No. 3,488,204  Dated January 6, 1970

Merrill E. Jordan et al.

It is certified that error appears in the above-identified patent and that said Letters Patent are hereby corrected as shown below:

Column 2, line 3, "backs" should read -- blacks.

Column 8, line 54, "coating" should be -- coated --.

SIGNED AND
SEALED
JUN 16 1970

(SEAL)
Attest:

Edward M. Fletcher, Jr.
Attesting Officer

WILLIAM E. SCHUYLER, JR.
Commissioner of Patents